(12) United States Patent
Shibata et al.

(10) Patent No.: US 6,223,798 B1
(45) Date of Patent: May 1, 2001

(54) HEAD CHIP MOUNTING APPARATUS

(75) Inventors: Keiichi Shibata; Michihiro Mori, both of Miyagi (JP)

(73) Assignee: Sony Corporation, Tokyo (JP)

( * ) Notice: Subject to any disclaimer, the term of this patent is extended or adjusted under 35 U.S.C. 154(b) by 836 days.

(21) Appl. No.: 08/491,381

(22) Filed: Jun. 16, 1995

(30) Foreign Application Priority Data

Jun. 22, 1994 (JP) .................................................... 6-139991

(51) Int. Cl.$^7$ .................................................... B32B 31/20
(52) U.S. Cl. ..................... 156/358; 156/363; 156/379.8; 156/542; 156/562
(58) Field of Search ..................... 156/350, 358, 156/363, 379.8, 541, 542, 560, 562

(56) References Cited

U.S. PATENT DOCUMENTS

| | | | | |
|---|---|---|---|---|
| 5,234,530 | * | 8/1993 | Freeman, III | 156/358 |
| 5,324,381 | * | 6/1994 | Nishiguchi | 156/297 |
| 5,397,423 | * | 3/1995 | Bantz et al. | 156/350 |
| 5,403,412 | * | 4/1995 | Hidaka et al. | 156/350 |

FOREIGN PATENT DOCUMENTS

| | | | |
|---|---|---|---|
| 44519 | * | 1/1982 | (EP) . |
| 0 488 658 A2 | | 6/1992 | (EP) . |
| 0 491 382 A2 | | 6/1992 | (EP) . |

OTHER PUBLICATIONS

English Language Abstract of JP 63–253510 (A).
English Language Abstract of JP 05–325115.
English Language Abstract of JP 63–253510.

\* cited by examiner

*Primary Examiner*—Michael W. Ball
*Assistant Examiner*—John T. Haran
(74) *Attorney, Agent, or Firm*—Ronald P. Kananen; Rader, Fishman & Grauer

(57) ABSTRACT

A magnetic head chip bonding device for bonding plural magnetic head chip to a base member to produce a composite type magnetic head is disclosed. The device includes a magnetic head chip retention unit for applying the pressure to the magnetic head chip for applying the magnetic head chip against the base member, and a magnetic head chip holding unit for holding the magnetic head chip. The device also includes a magnetic head chip detection unit for detecting the position of the magnetic head chip and a magnetic head chip shifting unit for shifting the magnetic head chip and the magnetic head chip holding unit responsive to an output of the magnetic head chip position detection unit. The pressure exerted by the magnetic head chip retention unit on the magnetic head chip is preferably variable, and the magnetic head chip holding unit preferably is made up of a pair of supporting members clamping the magnetic head chip in- between. The device renders it possible to bond the magnetic head chips to the base member in position without requiring operation skill.

4 Claims, 15 Drawing Sheets

HEAD CHIP MOUNTING APPARATUS

BACKGROUND

1. Field of the Invention

This invention relates to a magnetic head chip bonding device for bonding plural magnetic head chips to a base member. More particularly, it relates to positioning adjustment of respective magnetic head chips.

2. Background of the Invention

A composite magnetic head, including plural magnetic head chips T1, has an erasure magnetic head chip and a reproducing magnetic head chip or a recording magnetic head chip, bonded with an adhesive 60 to a common base member B1, as shown in FIGS. 1 and 2.

In order to secure the magnetic head chips to the base member in this manner, it becomes necessary to effect positioning adjustment of the gap-to-gap distance, parallelism, track positions or the like to high accuracy for each of the magnetic head chips.

Such setting or adjustment is performed in the following manner, as shown in FIGS. 3 and 4

(i) Referring to FIG. 3, a distance X between a magnetic gap g1 of a magnetic head chip T1 and the lateral surface of the base member B1 is adjusted. The direction of this adjustment is hereinafter referred to as an X-axis direction. At this time, a distance c between the magnetic gaps g1 of the respective magnetic head chips T1 is adjusted, as shown in FIG. 4.

ii) Referring to FIG. 3, a distance Y between the magnetic gap g1 of the magnetic head gap T1 and the rear surface of the base member B1 is adjusted. The direction of this adjustment is hereinafter referred to as a Y-axis direction. At this time, an offset e in protrusion along the Y-axis of the magnetic head chips T1 is adjusted, as shown in FIG. 3, for aligning the protrusion of the respective magnetic head chips T1.

(iii) Referring to FIG. 4, a distance Z between track edges E of the magnetic head chips T1 and the upper surface of the base member B1 is adjusted. The direction of this adjustment is referred to hereinafter as a Z-axis direction. At this time, an offset d between the track edges e along the Z-axis of the respective magnetic head chips T1 is adjusted, as shown in FIG. 4, for aligning the track edges E of the respective magnetic head chips T1.

(iv) Referring to FIG. 4, a tilt g of the gaps g1 of the magnetic head chips T1 is adjusted. This adjustment is referred to hereinafter as azimuth adjustment.

(v) Referring to FIG. 3, rotation θ of the magnetic head chips T1 on the upper surface of the base B1 about the Z-axis direction as an axis of rotation is adjusted. The direction of this rotation is hereinafter referred to as a θ-direction.

When bonding the plural magnetic head chips to the base member by such adjustment, the following method has so far been used.

The first method is to employ a pair of holding tools 61, such as electromagnetic collets, for positioning the magnetic head chips T1, which are bonded in the floating state without being contacted with the base member B1.

With this first bonding method, an UV curable adhesive 62 is applied to pre-set points on the base member B1 to which the magnetic head chips T1 are to be bonded. The upper surfaces of the magnetic head chips T1 are brought into contact with the holding tools 61, such as the above-mentioned electromagnetic collets, and thereby held magnetically. The holding tools 61 are moved along the X-axis, Y-axis, Z-axis and the θ-axis for shifting the magnetic head chips T1 to pre-set positions on the base member B1. At this time, the magnetic head chips T1 are placed over the base member B1 via the adhesive 62, such that the magnetic head chips T1 are not contacted with the base member B1, as shown in FIG. 6. In this state, UV rays are radiated for curing the adhesive 62. After the adhesive 62 is cured, the holding tools 61 are separated away from the magnetic head chips T1 to complete the bonding of the magnetic head chips T1.

However, since the contact area between the holding tools 61 and the magnetic head chips T1 is small, it is difficult to support the magnetic head chips in parallel with one another, such that sufficient azimuth adjustment cannot be achieved and azimuth defects tend to be incurred. On the other hand, it is difficult to apply the adhesive 62 uniformly such that differences in thickness are produced and the adhesive tends to be contracted in variable amounts at the time of curing of the adhesive 62. The result is offset in step difference adjustment and defects in track height. In addition, the holding tools 61 need to be secured until the adhesive 62 is cured to some extent, so that productivity cannot be improved.

The second method consists in gripping the lateral surfaces of the magnetic head chips T1 with a pair of holding tools 63 formed of a magnetic alloy for supporting and positioning the magnetic head chips T1 under the magnetism of the holding tools 63 as shown in FIG. 7. The magnetic head chips T1 are retained by a pair of magnetic head retention units 64 for provisionally holding the magnetic head chips T1 on the base member B1. The magnetic head chips T1 are subsequently bonded to the base member B1.

In carrying out the second method, a pair of the holding tools 63 formed of magnetic alloy are used to grip the lateral sides of the magnetic head chips T1 for supporting the magnetic head chips T1 using the magnetism produced by the holding tools 63. The magnetic holding tools 63 are moved along the X-axis, Y-axis, Z-axis and along the θ-axis for shifting the magnetic head chips T1 to pre-set positions on the base member B1. After completion of the positioning, magnetic head chip retention units 64 are applied against the upper surfaces of the magnetic head chips T1 under pressure for holding the magnetic head chips T1 against the base member B1. With the magnetic head chips T1 temporally held on the base B1 by the magnetic head chip retention units 64, the holding tools are detached from the magnetic head chips T1. An instantaneous adhesive is applied on and around the magnetic head chips T1 for securing the magnetic head chips T1. After curing of the instantaneous adhesive, the magnetic head chip retention units 64 are detached and moved away from the magnetic head chips T1 to complete the bonding of the magnetic head chips.

With the present second method, since the holding tools 63 and the magnetic head chips T1 are held in contact with each other by magnetism only, the magnetic head chips T1 are unstable in attitude and cannot be positioned accurately. In addition, when the holding tools 63 are removed from the magnetic head chips T1 after completion of positioning of the magnetic head chips, the magnetic head chips T1 are retained solely by the magnetic head chip retention units 64. Thus the magnetic head chips T1 tend to shift when the holding tools 63 are separated (disconnected) from the magnetic head chips T1. In addition, since the magnetic head chip retention units 64 contact the magnetic head chips T1 when separating the holding tools 63 away from the magnetic head chip retention units 64 after the end of positioning of the magnetic head chips T1, the magnetic head chips T1 tend to be shifted by contact with the magnetic head chip retention units 64.

The third bonding method consists in temporally retaining the magnetic head chips T1 set on the base member B1 using magnetic head chip retention units 65 and finely adjusting the positions of the magnetic head chips T1 manually. The magnetic head chips are bonded in the thus adjusted positions, as shown in FIG. 7.

First, the operator sets the magnetic head chips T1 as with pincers on the base member B1 and presses the magnetic head chip retention units 65 against the upper surfaces of the magnetic head chips T1 for provisionally holding the magnetic head chips T1. The operator then manipulates metal rods 66 (see FIG. 8) having pointed ends with both hands and, holding both sides of the magnetic head chips T1 therewith, shifts the magnetic head tips T1 to a pre-set position. After completion of positioning of the magnetic head chips T1, the operator applies the instantaneous adhesive to and around the magnetic head chips T1 for securing the magnetic head chips. After curing the instantaneous adhesive, the operator releases the magnetic head chip retention units 65 from the magnetic head chips T1 to complete the bonding of the magnetic head chips T1.

This method requires skill on the part of the operator since the magnetic head chips T1 need to be moved manually in the order of only several microns.

With the conventional method for bonding the magnetic head chips, it is difficult to achieve correct positioning and adjustment, thus producing defects in track height or azimuth, while skill on the part of the operator is required.

OBJECT AND SUMMARY OF THE INVENTION

It is therefore a principal object of the present invention to provide a magnetic head chip bonding device whereby each magnetic head chip may be accurately positioned and bonded without requiring operational skill.

In one aspect, the present invention provides a magnetic head chip bonding device for bonding a magnetic head chip to a base member having a magnetic head chip retention unit for applying the pressure to the magnetic head chip for pressing the magnetic head chip against the base member, a magnetic head chip holding unit for holding the magnetic head chip, a magnetic chip head detection unit for detecting the position of the magnetic head chip and a magnetic head chip shifting unit for shifting the magnetic head chip and the magnetic head chip holding unit responsive to an output of the magnetic head chip position detection unit.

In another aspect, the present invention provides a method for bonding a magnetic head chip to a base member comprising a first step of applying a weak pressure against the magnetic head chip for pressing the magnetic head chip against the base member, a second step of supporting and shifting the magnetic head chip for positioning, and a third step of retaining the magnetic head chip after the end of the second step, and a fourth step of coating an adhesive to an area between the base member and the magnetic head chip.

The pressure exerted by the magnetic head chip retention unit on the magnetic head chip is preferably variable, and the magnetic head chip holding unit preferably is made up of a pair of supporting members clamping the magnetic head chip in-between.

The magnetic head chip shifting unit preferably shifts the magnetic head chip and the magnetic head chip holding unit by linear movement along three axes perpendicular to one another and by rotation about a selected one of the three axes.

Since the magnetic head chip is thrust against the base member by the magnetic head chip retention unit, the magnetic head chip and the base member are satisfactorily bonded to each other to prevent azimuth defects. Since the magnetic head chip shifting unit is provided for shifting the magnetic head chip and the magnetic head chip holding unit responsive to the output of the magnetic head chip position detecting unit, the magnetic head unit can be positioned without requiring operational skill.

Also the magnetic head chip can be provisionally retained or secured by the variable pressure exerted by the magnetic head retention unit on the magnetic head chip. Thus, by retaining the magnetic head chip with a weaker pressure for positioning, the magnetic head chip can be provisionally retained and subsequently positioned. After the end of positioning, the magnetic head chip can be secured by retaining the magnetic head chip under a higher pressure for prohibiting the thus positioned magnetic head chip from being moved.

In addition, since the magnetic head chip holding unit is made up of two supporting members clamping members clamping the magnetic head chip therebetween, the magnetic head chip can be supported in stability.

It is possible with the present invention to achieve positioning adjustment during magnetic head chip bonding without requiring operational skill.

The pressure of retaining the magnetic head chip on the base member by the magnetic head chip retention unit or the pressure of supporting the magnetic head chip by the magnetic head chip holding unit can be varied freely, so that there is no risk of the magnetic head chip being moved arbitrarily. Specifically, when the magnetic head chip supporting members are opened apart for releasing the magnetic head chip, there is a risk that the magnetic head chip so far clamped strongly and released suddenly undergoes an arbitrary movement. This can be avoided with the present invention because it is possible to release the magnetic head chip gradually to prevent its arbitrary movement. Alternatively, by retaining the magnetic head chip unit by the magnetic head chip retention unit by provisional retention and complete retention, the magnetic head chip can be positively supported and secured after the end of positioning, so that there is no risk of the magnetic head chip being moved arbitrarily after the end of positioning.

The present invention thus permits facilitated and positive bonding of the magnetic head chip, so that the magnetic head chip can be bonded in a shorter time and track height defects or azimuth defects may be prohibited to improve production yield. The result is improved productivity and reduction in the production cost of the magnetic head.

DETAILED DESCRIPTION OF THE INVENTION

Figure 1:
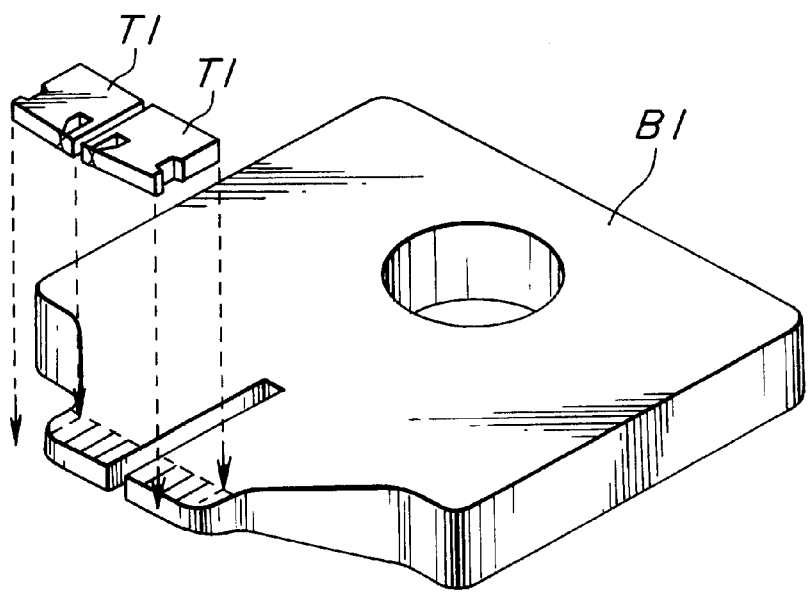
FIG. 1 is a perspective view showing how two magnetic head chips are bonded to a base member.
Figure 2:
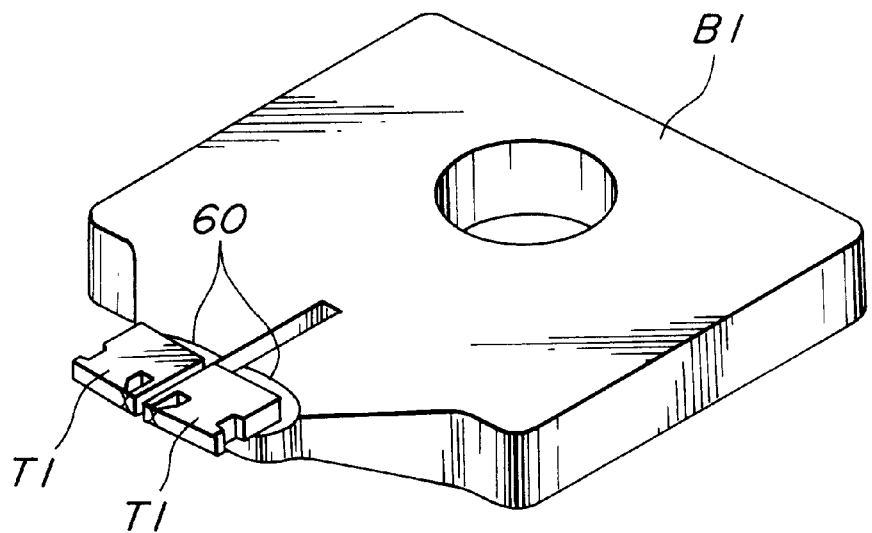
FIG. 2 is a perspective view showing two magnetic head chips which have been bonded to a base member.
Figure 3:
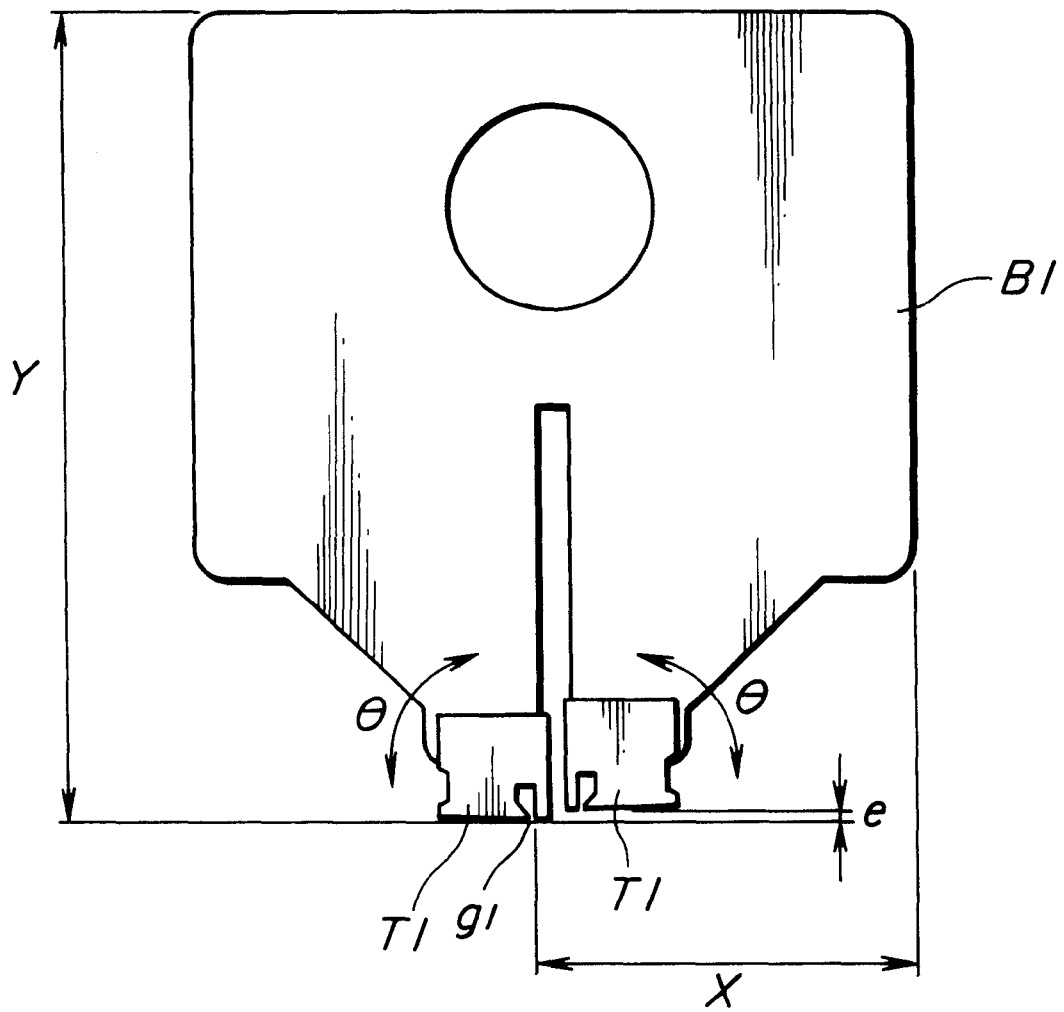
FIG. 3 is a top plan view showing a base member and a magnetic head chip for illustrating the positioning adjustment required when bonding the magnetic head chip on the base member.
Figure 4:
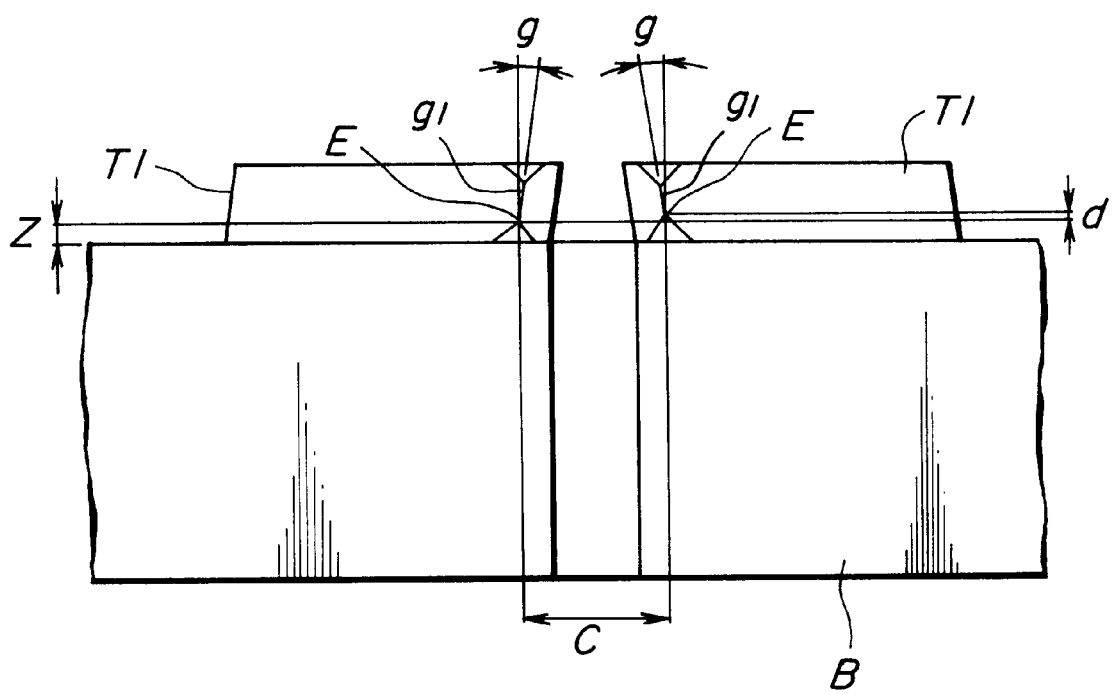
FIG. 4 is an enlarged plan view showing essential portions of the base member and the magnetic head chip from the surface thereon on which slides a magnetic recording medium and also showing the positioning adjustment required when bonding the magnetic head chip to the base member.
Figure 5:
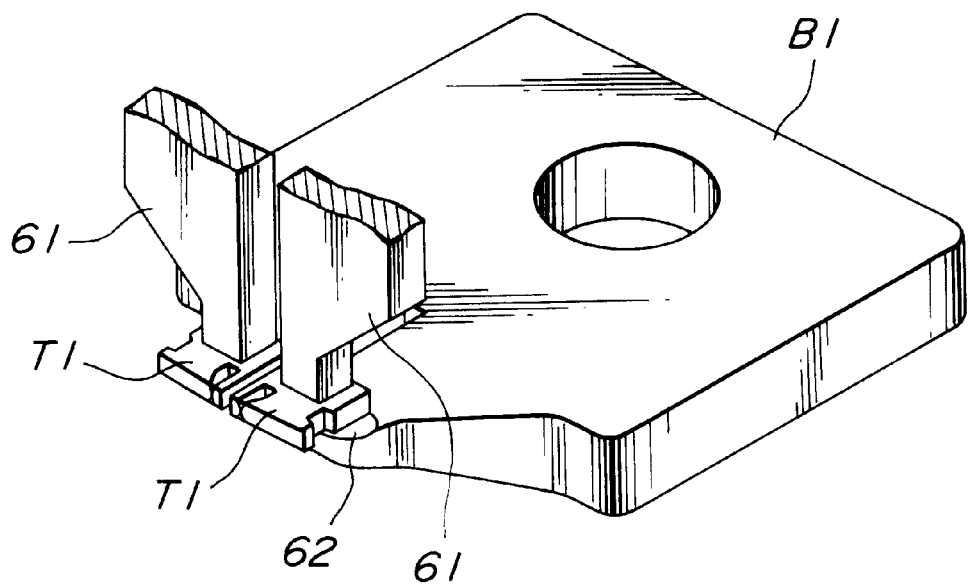
FIG. 5 is an enlarged schematic perspective view showing how the magnetic head chip is positioned by a conventional magnetic head chip bonding device.

Referring to the drawings, a preferred embodiment of the present invention will be explained in detail. Although the following description is made with reference to a magnetic head chip bonding device adapted for bonding two magnetic head chips on a base member, this is not limitative and the magnetic head chip bonding device may also be configured to bond three or more magnetic head chips.

The magnetic head chip bonding device of the present embodiment includes a furnishing (supply) unit for furnishing a base member and magnetic head chips and a bonding unit 5 for bonding the base member and the magnetic head chips supplied by the furnishing unit.

Figure 9:
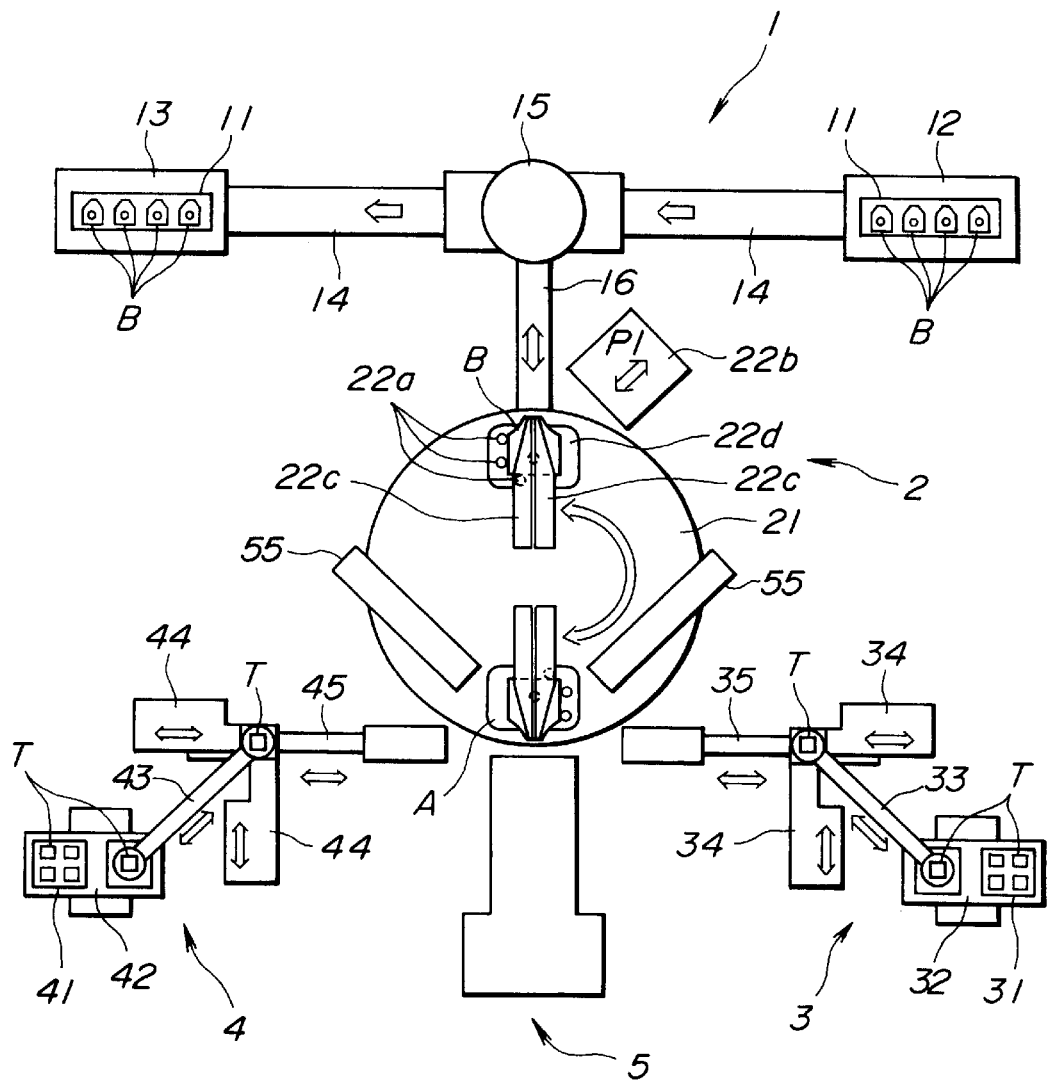
FIG. 9 is a schematic view showing an illustrative construction of a magnetic head chip bonding device according to the present invention.

Referring to FIG. 9, the furnishing unit includes a base member furnishing section 1 for sequentially furnishing plural base members B, a base member supporting section 2 for supporting the base members B at the time of bonding of the magnetic head chips, a magnetic head chip furnishing section 3 for furnishing first magnetic head chips T and another magnetic head chip furnishing section 4 for furnishing second magnetic head chips T.

The base member furnishing section 1 has a base member housing magazine 11 for housing the base members B, a base member furnishing stocker 12 in which the base member housing magazine 11 for housing the base members B prior to bonding of the magnetic head chips thereon is stocked, and a finished article stocker 13 to which the base member housing magazine 11 housing the base members B having the magnetic head chips bonded thereto is transferred. A base member transporting unit 14 transfers the base members B prior to bonding of the magnetic head chips thereto from the base member furnishing stocker 12 to a base member entrance/exiting unit as later explained, with the base member housing magazines as transfer units, while transferring the base members B after bonding the magnetic head chips thereto from the base member entrance/exiting unit to the finished article stocker 13 with the base member housing magazines as transfer units. A magazine entrance-exiting unit 15 takes out the base members B prior to bonding of the magnetic head chips one-by-one from the base member housing magazine 11 transported thereto by the magazine transporting unit 14 and transports the base members to a base member supporting unit as later explained, while housing the base members B having the magnetic head chips bonded thereto and transported from the base member supporting unit one-by-one in the base member housing magazine 11. A base member transporting unit 16 transfers the base members from the base member entrance/exiting unit 15, by vacuum suction to the base member supporting section 2, while transferring the base members B having the magnetic head chips bonded thereto from the base member supporting section 2 to the base member entrance/exiting unit 15. The base members B prior to bonding of the magnetic head chips thereto are adjusted by the base member entrance/exiting unit 15 so that the magnetic head chip bonding surfaces thereof are directed upwards before being fed to the base member supporting section 2.

The base member supporting section 2 has a rotary table unit for setting the base members B transported by the base member transporting unit 16 thereon and a base member securement unit for securing the base members B arranged on the rotary table unit.

The base member securement unit has three pins 22a arranged on the rear surface and one lateral surface of the base member B, an actuator 22b movable in a direction indicated by arrow P1 for thrusting the base member B against these pins 22a, an upper base member surface supporting member 22c arranged over the upper surface of the rear end of the base member and a lower base member surface supporting member 22d arranged on the lower base member surface. The lower base member surface supporting member 22d has a vertically movable actuator, not shown. For securing the base member B by the base securement unit, the base member B is thrust against the pins 22a by the actuator 22b for positioning the base member B and the lower base member surface supporting member 22d is hoisted along with the base member B by the actuator for clamping and securing the base member B between the lower base member surface supporting member 22d and the upper base member surface supporting member 22c.

The rotary table unit is constituted by a rotary table 21 on which there is arranged the above-described base member securement unit. The base member B prior to bonding of the magnetic head chip, transferred by the base transporting unit 16 to the base member supporting section 2, is secured to the base member securement unit on the table 21 and subsequently shifted by rotation of the table 21 to a predetermined position on the bonding unit, that is a site of bonding of the magnetic head chip A, where the magnetic head chip T is bonded on the base member. The base member B, having the magnetic head chip T bonded thereto by the bonding unit, is again moved, by rotation of the table 21, to a site facing the base member transporting unit 16. The base member B is then transported by the base member transporting unit 16 out of the base member supporting section 2. For improving productivity, two securement units may be provided on the table 21 so that the magnetic head chip T will be bonded to the base member in one of these base member securement units and the base members B will be furnished and discharged by the base member transporting unit 16 in the other of the base member securement units.

The first magnetic head chip furnishing section 3 includes a magnetic head chip housing tray 31 for housing the magnetic head chip units T and a magnetic head chip furnishing stocker 32 in which the magnetic head chip housing tray 31 having the magnetic head chips T housed therein is set. The magnetic head chip transporting device feeds the magnetic head chips T one-by-one under vacuum suction from the magnetic head chip furnishing stocker 32 to a transient positioning unit 34. The transient positioning unit 34 positions the magnetic head chip T transferred by a magnetic head chip transporting unit 33. A magnetic head chip transporting unit 35 shifts the magnetic head chips T on the transient positioning unit 34 to a pre-set position of the bonding unit 5 as later explained. The purpose of shifting the magnetic head chip T by the magnetic head chip shifting unit 35 to the pre-set position of the bonding unit 5 after transient positioning by the transient positioning unit is to assure positive support of the magnetic head chip T by a magnetic head chip holding unit as later explained.

Similarly to the first magnetic head chip furnishing section 3, the second magnetic head chip furnishing section 4 has a magnetic head chip housing tray 41, a magnetic head chip supplying stocker 42, a magnetic head chip transporting unit 43, a transient positioning unit 44 and a magnetic head chip shifting unit 45, and handles the furnishing of the magnetic head chips T.

Figure 6:
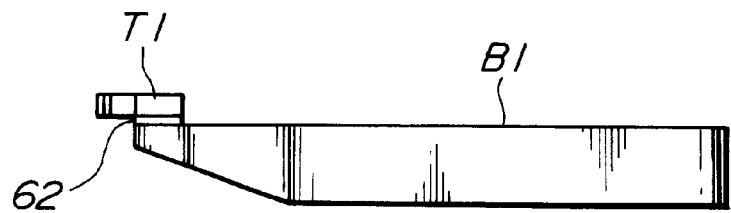
FIG. 6 is a side view showing an example of a magnetic head chip and a base member bonded together by the method shown in FIG. 5.
Figure 7:
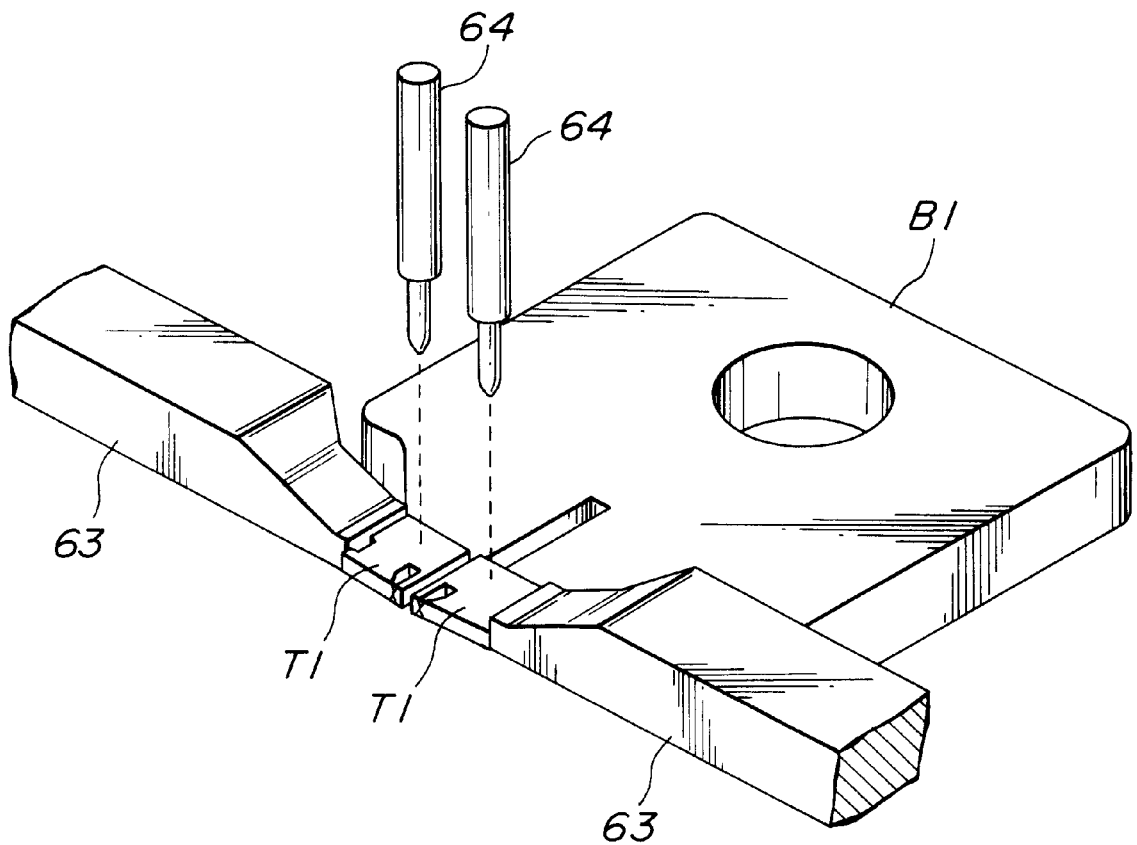
FIG. 7 is an enlarged schematic perspective view showing another example of positioning of the magnetic head chip using a conventional magnetic head chip bonding device.
Figure 8:
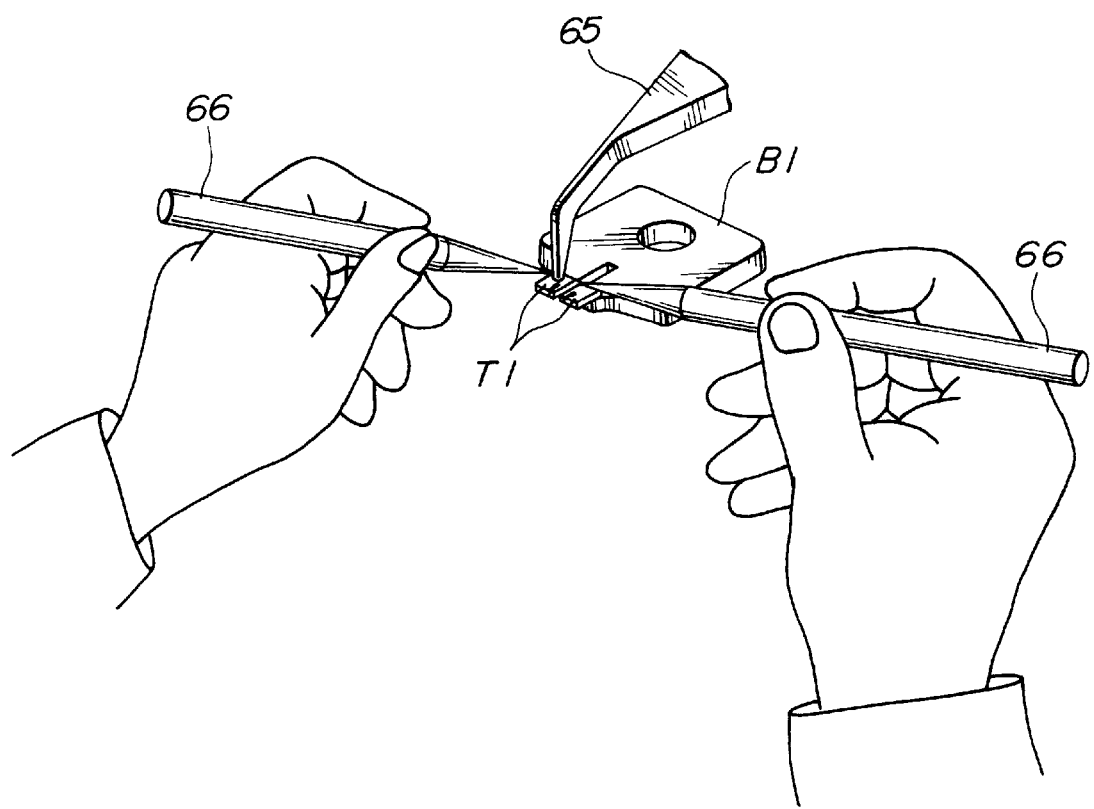
FIG. 8 is an enlarged schematic perspective view showing an example of manual positioning of the magnetic head chip using a conventional technique.
Figure 10:
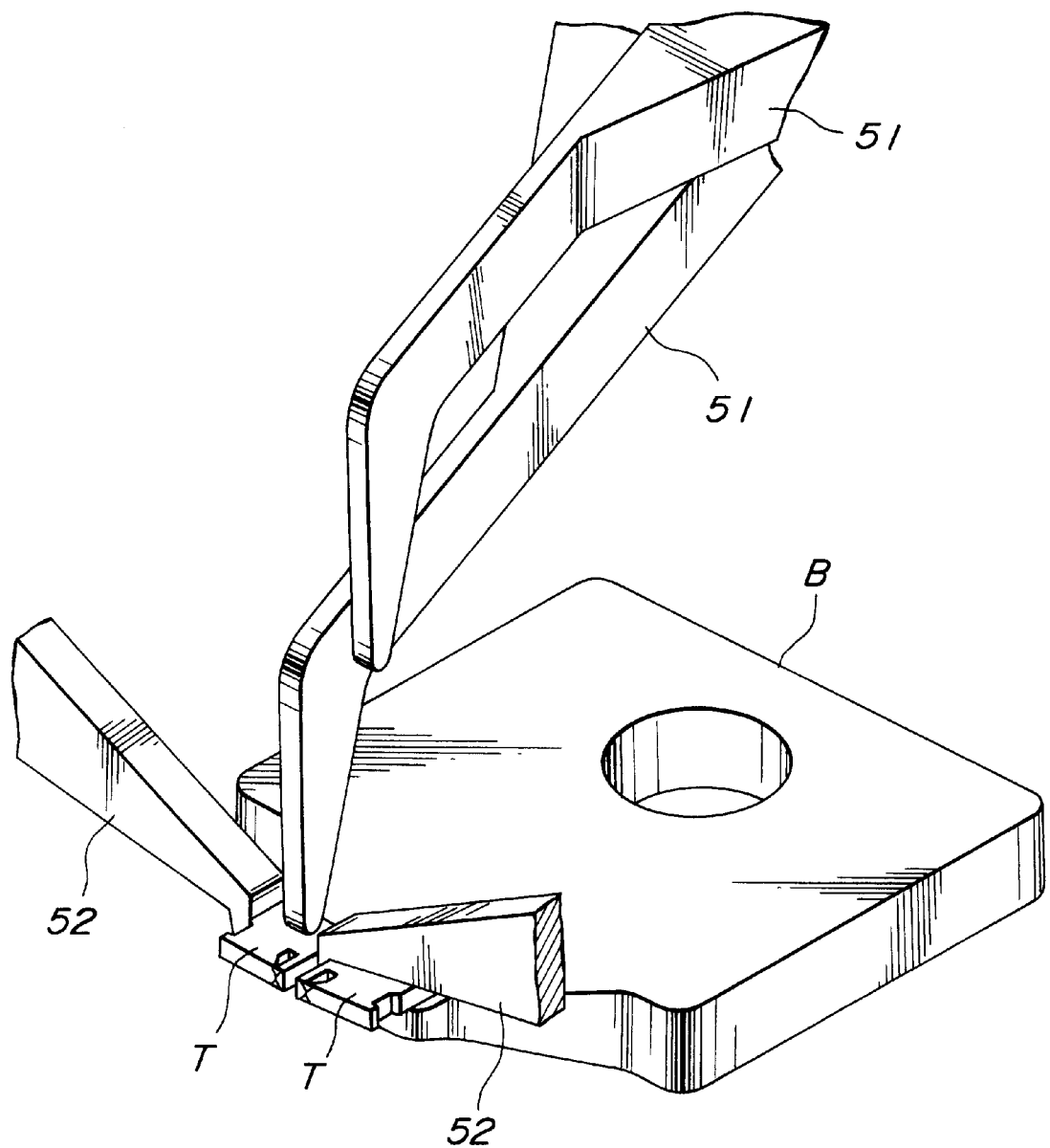
FIG. 10 is a schematic perspective view showing essential portions of a typical construction of a magnetic head chip retention unit and a magnetic head chip holding unit of the magnetic head chip bonding device according to the present invention.
Figure 11:
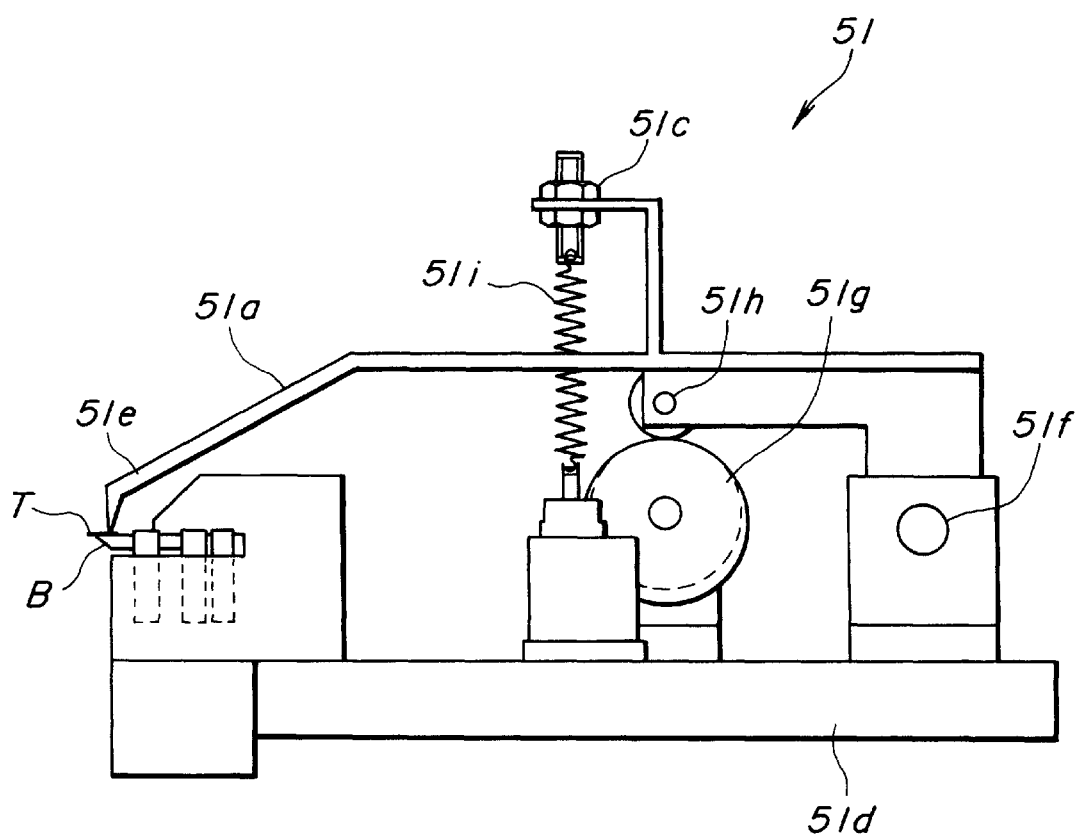
FIG. 11 is a side view showing a typical construction of a magnetic head chip retention unit of the magnetic head chip device according to the present invention.
Figure 12:
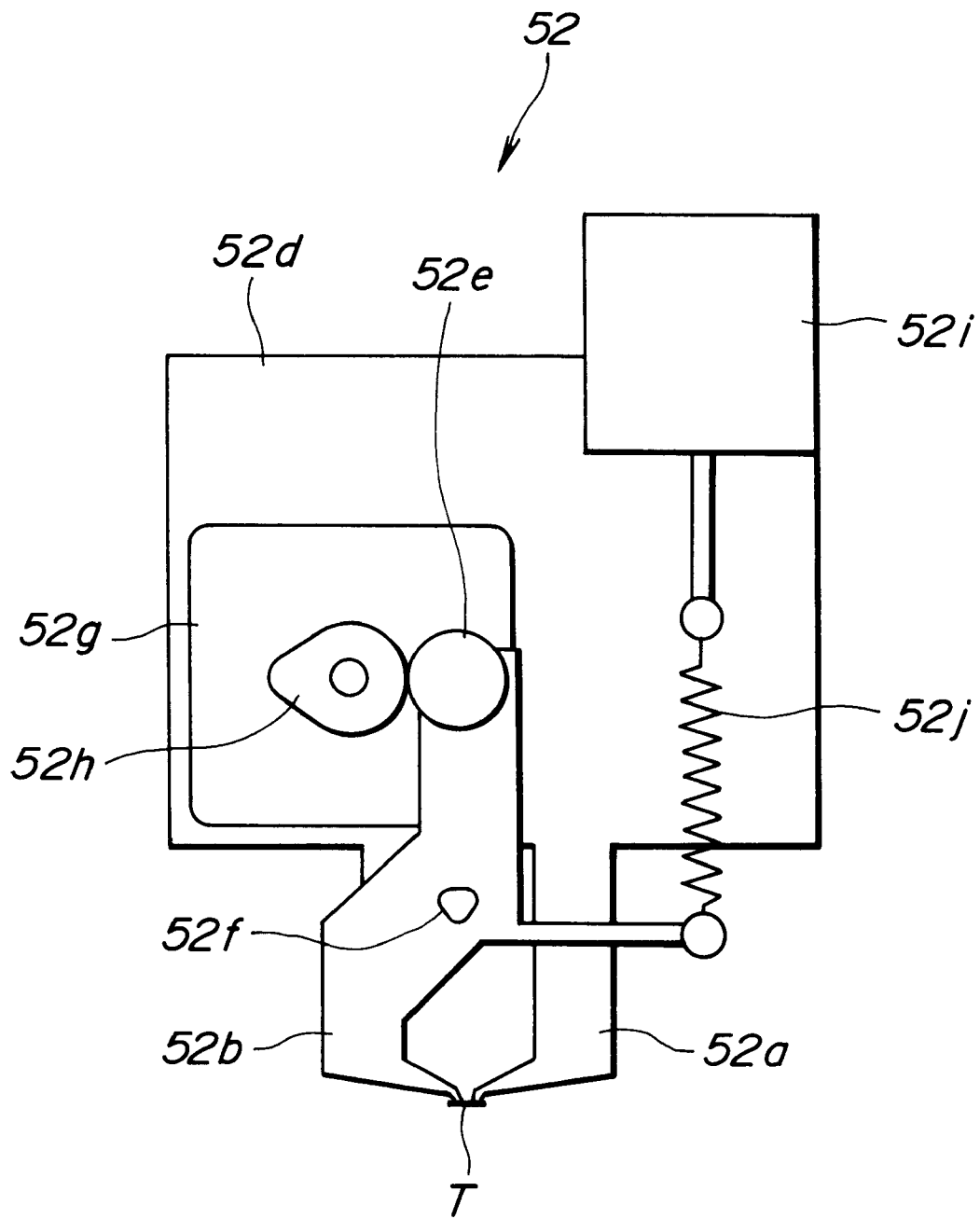
FIG. 12 is a side view showing a typical construction of a magnetic head chip holding unit of the magnetic head chip device according to the present invention.
Figure 13:
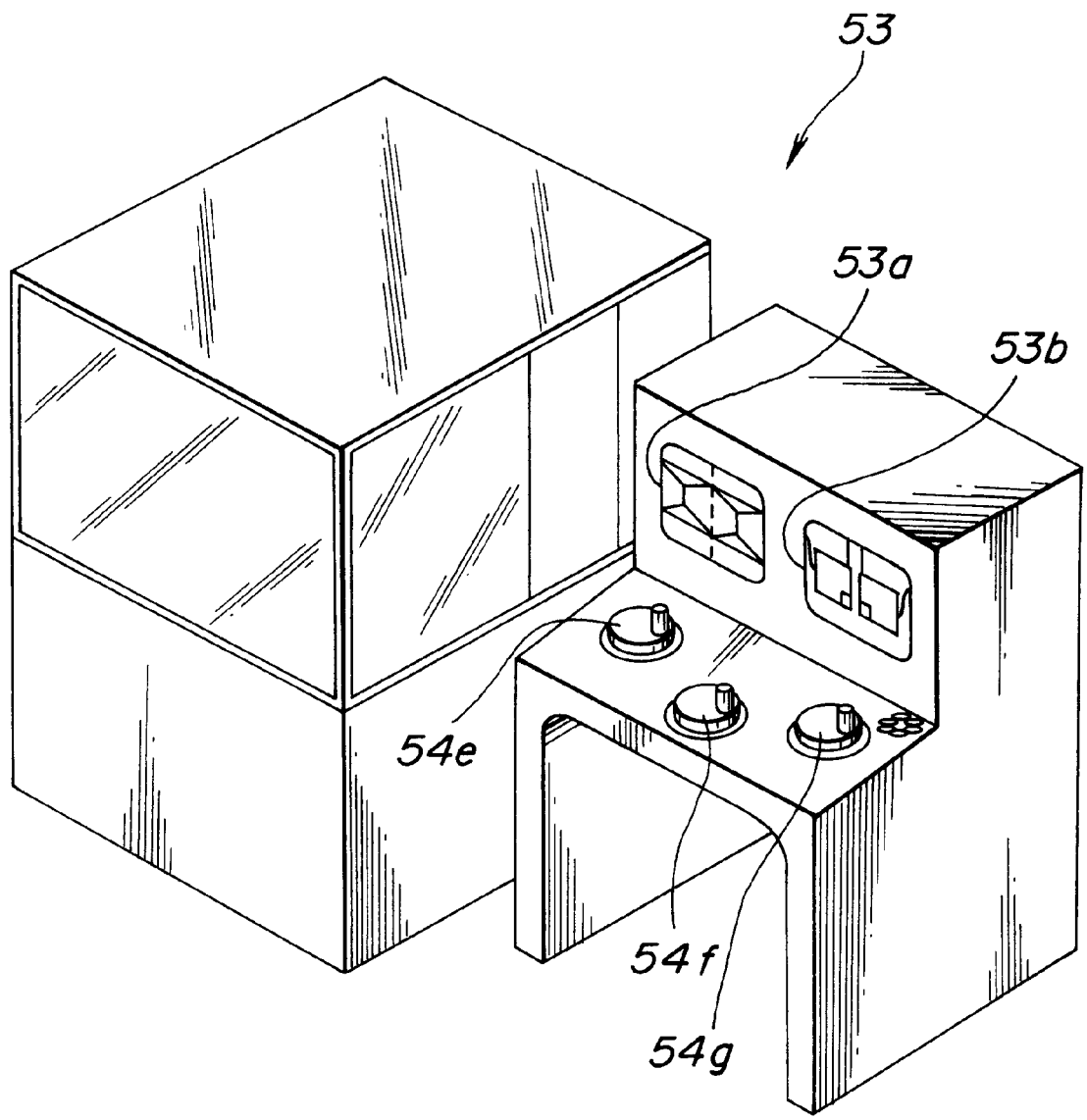
FIG. 13 is a perspective view showing a typical construction of a magnetic head chip position detection unit of the magnetic head chip bonding device according to the present invention.

The bonding unit 5 is arranged in the vicinity of the magnetic head chip bonding site A as shown in FIG. 9. The bonding unit includes a magnetic head chip retention section 51 for thrusting the magnetic head chip T against the base member B, as shown in FIGS. 10 and 11, a magnetic head chip holding section 52 for holding the magnetic head chip as shown in FIGS. 10 and 12, and a magnetic head chip position detection section 53 for detecting and displaying the position of the magnetic head chip T as shown in FIG. 13. A magnetic head chip shifting section 54 is responsive to an output of the magnetic head chip position detection section 53 to shift the magnetic head chip T and the magnetic head chip holding section 52 as shown in FIG. 6. An adhesive supplying section 55 is arranged in the vicinity of the magnetic head chip bonding site A for supplying the adhesive to the magnetic head chip bonding site, as shown in FIG. 9.

The magnetic head chip retention section 51 has a magnetic head chip retention member 51a for retaining the magnetic head chip T, a magnetic head chip retention member driving unit for vertically shifting the magnetic head chip retention member, a pressure control section 51c for changing the pressure applied by the magnetic head chip retention member 51a on the magnetic head chip T and a magnetic head chip retention section supporting base 51d, as shown in FIG. 11. Two of the magnetic head chip retention sections 51 are arranged in the vicinity of the magnetic head chip bonding site A in registration with two magnetic head chips T to be bonded to the base member, as shown in FIG. 10.

The magnetic head chip retention member 51a is arranged on the magnetic head chip retention section supporting base 51d so that its distal end 51e is positioned on the magnetic head chip T while its proximal end 51f is pivotally mounted as shown. The distal end 51e is bent in an L-shape towards the magnetic head chip T and is reduced in diameter for retaining the magnetic head chip T.

The magnetic head chip retention member driving unit is comprised of a Cam-type disk 51g performing an offset rotation and is mounted so that the lateral side of the disk 51g is in contact with a lower portion 51h of the magnetic head chip retention member 51a. As the disk 51g performs offset rotation, the magnetic head chip retention member 51a is moved or cammed vertically. That is, when the magnetic head chip retention member 51a is separated away from the magnetic head chip T, the disk 51g is rotated so that, for raising the magnetic head retention member 51a, the disk 51g is rotated for increasing the distance between the center of rotation of the disk 51g and the contact point between the disk 51g and the lower portion 51h of the magnetic head chip retention member 51a. When the magnetic head chip T is to be retained by the magnetic head chip retention member 51a, the disk 51g is rotated so that, for lowering the magnetic head retention member 51a, the disk 51g is rotated for decreasing the distance between the center of rotation of the disk 51g and the contact point between the disk 51g and the lower portion 51h of the magnetic head chip retention member 51a.

The pressure control section 51c is comprised of an elastic member 51i, such as a spring, mounted above and below the magnetic head chip retention member 51a, and controls the pressure exerted by the magnetic head chip retention member 51a on the magnetic head chip T by extension and contraction of the elastic member 51i. If the elastic member 51i is not provided, the pressure of the magnetic head chip retention member 51a on the magnetic head chip T is by the weight of the magnetic head chip retention member 51a. If the pressure is to be increased, it suffices to pull the lower end of the elastic member 51i downwards. If the pressure is to be lowered, it suffices to move the lower end of the elastic member 51i upwards.

The magnetic head chip retention section 52 includes two nipper-like magnetic head chip supporting members 52a, 52b for clamping the magnetic head chip T there between, a magnetic head chip supporting member driving unit for opening and closing the magnetic head chip supporting members 52a, 52b, and a magnetic head chip holding unit supporting base 52d for supporting these components, as shown in FIG. 12.

The two magnetic head chip supporting members 52a, 52b are bent inwardly in an L-shape at the distal ends thereof towards the magnetic head chip T, and are tapered for supporting the magnetic head chip T. The magnetic head chip supporting members 52a, 52b are arranged so that the distal ends thereof normally abut against each other. The distal ends of the magnetic head chip supporting members 52a, 52b, are opened or closed for respectively releasing or supporting (gripping) the magnetic head chip T.

Of the two magnetic head chip supporting members 52a, 52b, the first magnetic head chip supporting member 52a is secured to the magnetic head chip holding section supporting base 52d. The second magnetic head chip supporting member 52b, having the magnetic head chip supporting member driving unit, is arranged so that its distal end faces the first magnetic head chip supporting member 52a, and includes a cam following-type bearing 52e at its rear end and a mounting portion 52f at its mid portion for mounting to the magnetic head chip holding section supporting base 52d. The second magnetic head chip supporting member 52b is rotatably mounted at the mounting portion 52f on the magnetic head chip holding section support base 52d.

The magnetic head chip supporting member driving unit is arranged on the magnetic head chip holding section supporting base 52d and includes a cam 52h rotated by an actuator 52g and an elastic member 52j, such as a spring, the tensile state of which can be changed by another actuator 52i. The cam 52h is kept in contact with the bearing 52e of the second magnetic head chip supporting member 52b. By rotation of the cam 52h, the second magnetic head chip supporting member 52b is rotated about the mounting portion 52f as the center of rotation for opening and closing the distal ends of the two magnetic head chip supporting members 52a, 52b. The elastic member 52j is mounted for pulling the second magnetic head chip supporting member 52b in a direction which means the distal ends of the two magnetic head chip supporting members 52a, 52b toward each other. Thus, by changing the tensile state of the elastic member 52j, the two magnetic head chip supporting members 52a, 52b can be variably biased toward each other.

The magnetic head chip position detection section 53 includes monitors 53a, 53b for displaying microscopically enlarged data of the base member B and the magnetic head chip T when positioning the base member B and the magnetic head chip T, as shown in FIG. 13. The monitors 53a, 53b display the surfaces of the base member and the magnetic head chip T on which slides the recording medium and the upper surfaces of the base member B and the magnetic head chip T, respectively.

Figure 14:
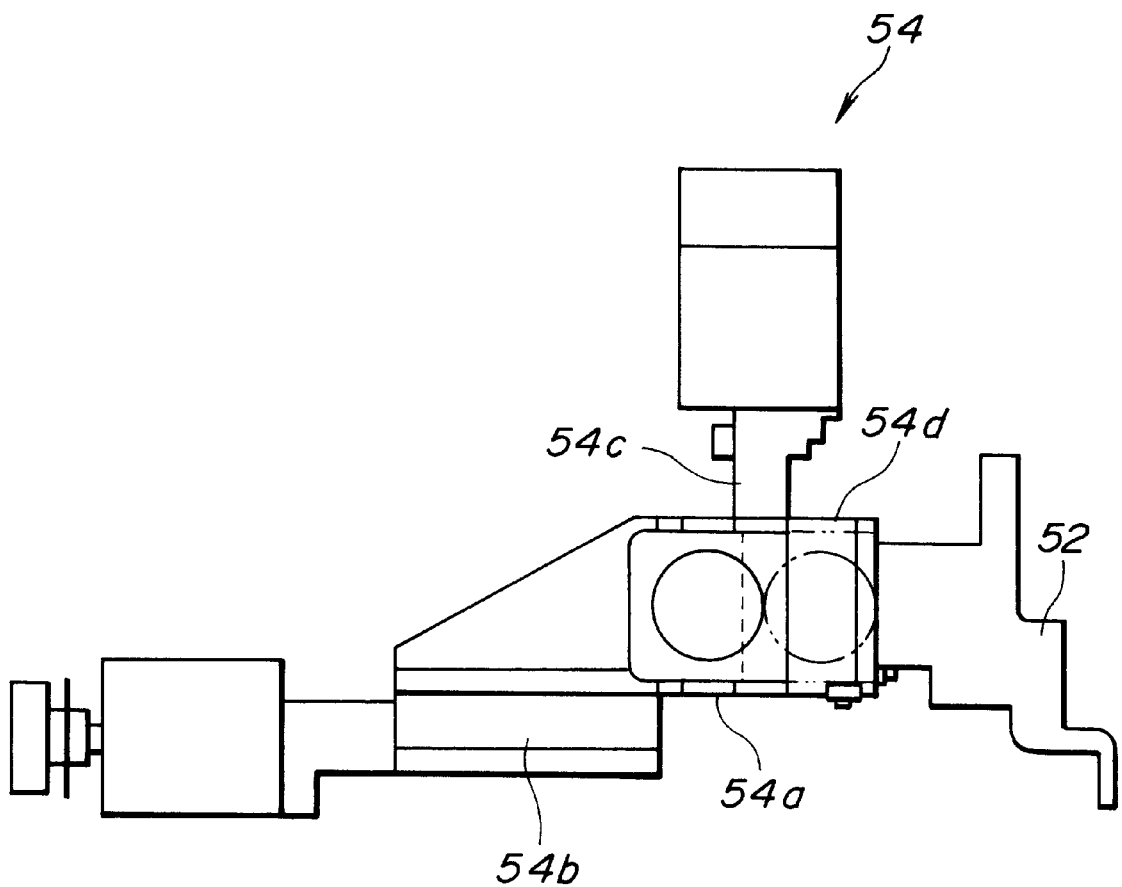
FIG. 14 is a side view showing a typical construction of a magnetic head chip shifting unit of the magnetic head chip bonding device according to the present invention.

A magnetic head chip shifting section 54 is configured to effect minute positioning movement of the magnetic head chips T. The magnetic head chip shifting section 54 includes an X-axis stage 54a, a Y-axis stage 54b and a Z-axis stage 54c for shifting the magnetic head chip holding section 52 along the X-axis, along the Y-axis stage 54a and along the Z-axis, respectively, and a θ-axis stage 54d for rotating the holding section 52 along the θ-axis, as shown in FIG. 14. The rotation along the θ-axis is adapted to occur about the distal end of the magnetic head chip T as the center of rotation for diminishing the shifting of the holding section along the X- and y-axes brought about by the rotation along the θ-axis.

For achieving fine positioning of the magnetic head chip T, there are provided, in the vicinity of the monitors 53a, 53b of the magnetic head chip position detection section 53, three handles 54e, 54f and 54g in association with the X-axis stage 54a, Y-axis stage 54b and the θ-axis stage 54d, respectively, for effecting fine movement or rotation of the respective stages, as shown in FIG. 13. That is, by rotating the handle 54e associated with the X-axis stage 54a, pulse signals are transmitted to the X-axis stage 54a for achieving fine movement of the X-axis stage 54a depending on the amount and the direction of rotation of the handle 54e. No handle is provided for the Z-axis stage 54c because fine adjustment of the magnetic head chip T along the Z-axis is achieved by the magnetic head chip retention unit 51 retaining the magnetic head chip.

The adhesive furnishing section 55 furnishes the adhesive to a contact point between the magnetic head chip T and the base member B after positioning the magnetic head chip T, and is arranged in the vicinity of the magnetic head chip bonding site A, as shown in FIG. 9. The adhesive is furnished to the contact point between the magnetic head and the base member B and mainly to the vicinity of the rear end of the magnetic head chip T.

The process of bonding the magnetic head chip to the base member using the above-described magnetic head chip bonding device is now explained by referring to the process flow charts shown in FIGS. 15 to 18.

Figure 15:
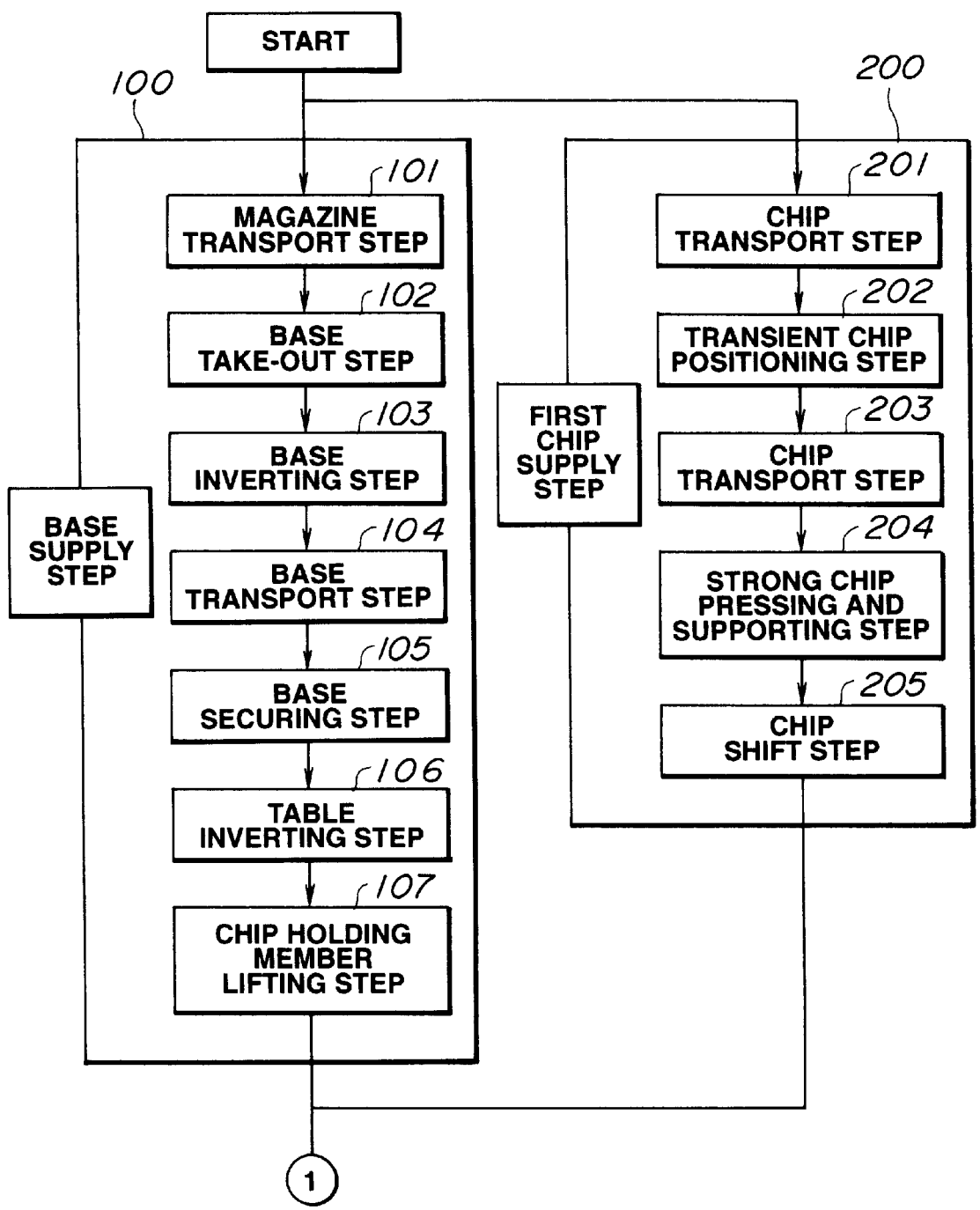
FIG. 15 illustrates the process flow for bonding of the magnetic head chip using the magnetic head chip bonding device according to the present invention.

First, the base members B are furnished, as shown in FIG. 15 (base member furnishing step 100). During the base member furnishing step, the base member housing magazine is taken out from the base member furnishing stocker and transported to the base member entrance/exiting unit by the magazine transporting unit (magazine transporting step 101). The base members B are taken out one-by-one by the base member entrance/exiting unit out of the base member housing magazine (base member take-out step 102). The base members are inverted in their positions so that the magnetic head chip bonding surfaces thereof are directed upwards (base member inverting step 103). The base members are then transported by the base member transporting unit to the base member securement unit on the rotary table unit (base member transporting step 104). Each base member B is secured by the base member securement unit at pre-set positions (base member securement step 105). The table of the rotary table unit is then rotated for moving the base member to the magnetic head chip bonding site (table rotating step 106). After completion of the table rotating step 106, the magnetic head chip retention member is uplifted in order to prohibit the magnetic head chip retention member from being contacted with either the magnetic head chip or the magnetic head chip supporting member during the chip transporting step as later explained (chip retention member uplifting step 107).

By a parallel operation to the base member furnishing process, the first magnetic head chip is furnished, as shown in FIG. 15 (first magnetic chip furnishing step 200). During the first chip furnishing step 200, magnetic head chips are taken out of the magnetic head chip housing tray of the magnetic head chip furnishing stocker and transported by the magnetic head chip transporting section to a temporary positioning section (chip transporting step 201). The magnetic head chip position is adjusted on the magnetic head chip supporting base of the temporary positioning section (temporary magnetic head chip positioning step 202). The temporarily positioned magnetic head chips are routed, along with the magnetic head chip supporting base of the temporary positioning section, to a magnetic head chip supporting section (chip transporting step 203). The magnetic head chips are supported by the magnetic head chip supporting members of the magnetic head chip holding unit (strong-pressure chip supporting step 204). For reliably supporting the magnetic head chips, the magnetic head chip supporting members are closed under a strong pressure by the magnetic head chip supporting member driving unit. Each magnetic head chip, supported by the magnetic head chip holding unit, is shifted to the magnetic head chip bonding site on the base member (chip shifting step 205).

Figure 16:
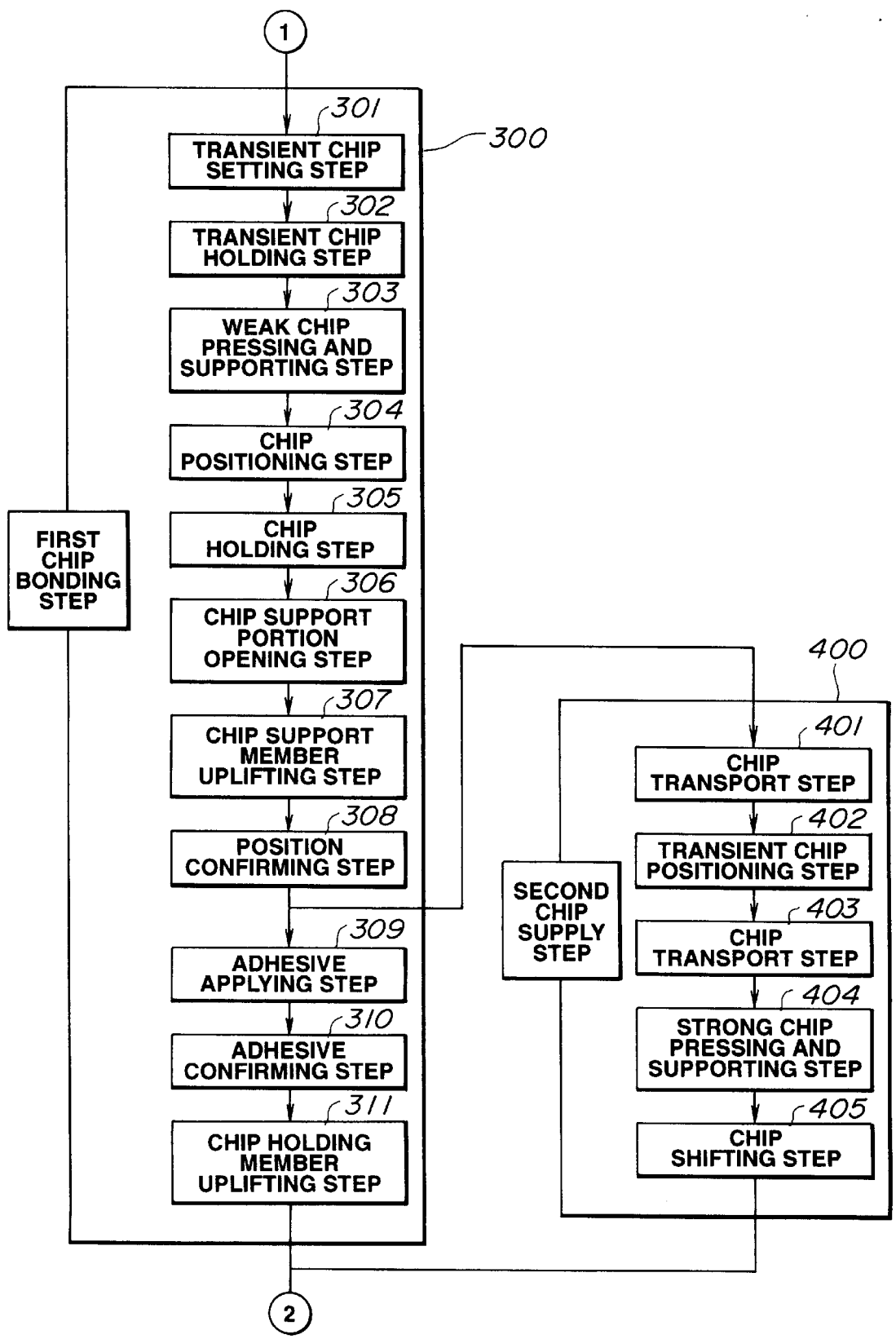
FIG. 16 illustrates the process flow, consecutive to FIG. 15, for bonding the magnetic head chip by the magnetic head chip bonding device according to the present invention.
Figure 17:
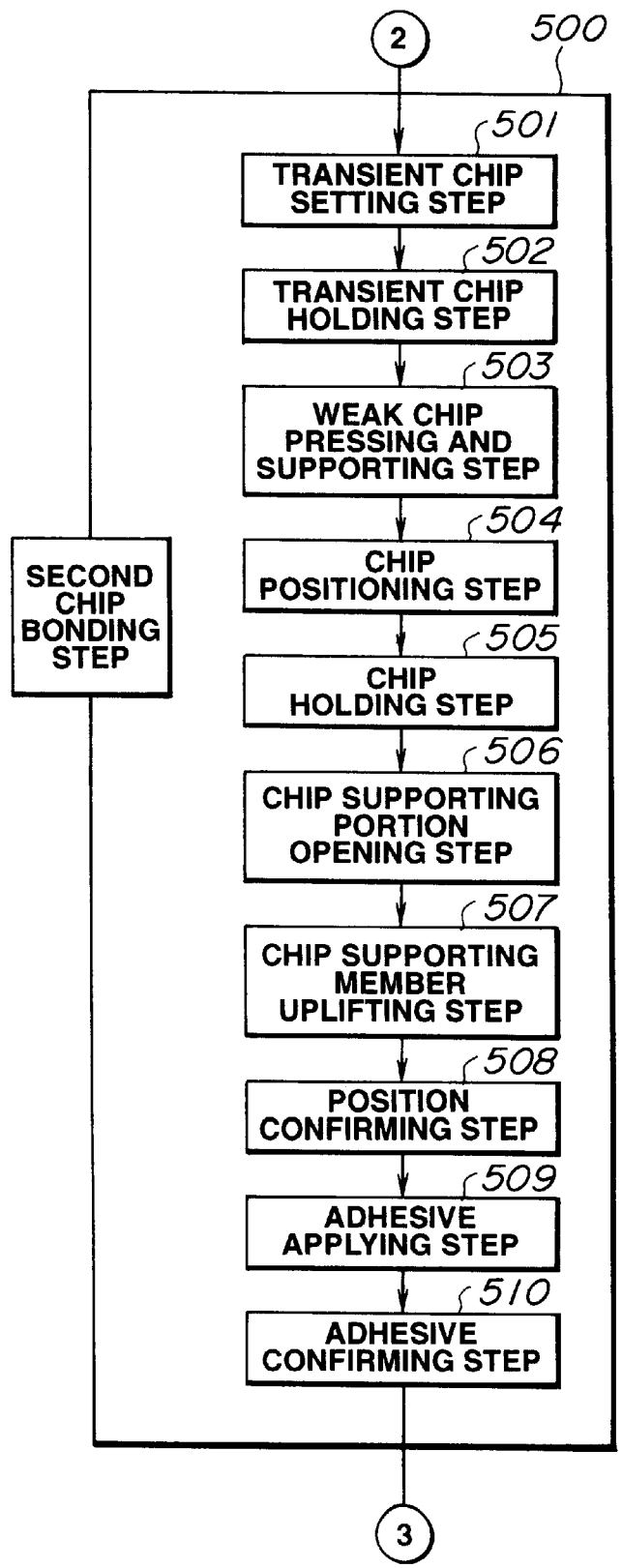
FIG. 17 illustrates the process flow, consecutive to FIG. 16, for bonding the magnetic head chip by the magnetic head chip bonding device according to the present invention.

Then, as shown in FIG. 16, the first magnetic head chip is bonded to the base member (first magnetic head chip bonding step 300).

During the first chip bonding step 300, the magnetic head chip shifted during the above-described chip shifting step 205 is provisionally set on the base member (transient chip setting step 301). For provisionally retaining the magnetic head chip on the base member, the magnetic head chip retention member of the magnetic head chip retention section is lowered and a weak pressure is applied to the magnetic head chip for pressing the magnetic head chip against the base member (provisional chip retaining step 302). If the magnetic head chip is provisionally retained and supported on the base member by the magnetic head chip retention section, the supporting pressure applied against the magnetic head chip by the magnetic head chip supporting member is released (weak-pressure chip supporting step 303).

As the operator views the monitors of the magnetic head chip position detection section, he or she operates on the handles associated with the Y-stage, X-stage and the θ-stage for actuating the respective stages for positioning the magnetic head chips (chip positioning step 304). After the end of positioning, the pressure applied against the magnetic head chip by the magnetic head chip retention unit is increased for prohibiting further movement of the magnetic head chip (chip retention step 305). The magnetic head chip supporting members of the magnetic head chip supporting section are opened, releasing the magnetic head chip (chip supporting member opening step 306), and are then shifted upwards (chip supporting member uplifting step 307). The magnetic head chip position is confirmed by the monitor of the magnetic head chip position detection section (position confirming step 308). If the positioning is found to be insufficiently accurate the magnetic head chip is again gripped and supported by the magnetic head chip supporting unit ready for re-positioning the magnetic head chip.

If sufficiently accurate positioning is achieved, the instantaneous adhesive is supplied to a contact point between the magnetic head chip and the base member by the adhesive supply unit (adhesive coating step 309). The adhesive coating state is checked by the monitor of the magnetic head chip position detection section (adhesive checking step 310). If the adhesive is supplied insufficiently such that the magnetic head chip is not positively bonded to the base member, the adhesive is applied again. If it has been confirmed that the magnetic head chip has been positively bonded to the base member, the magnetic head chip retention member is uplifted to prevent the magnetic head chip retention member from contacteing with the magnetic head chip and the magnetic head chip supporting member during the subsequent step of bonding the second magnetic head chip (chip retention member uplifting step 311). The above steps complete the bonding of the first magnetic head chip.

In parallel with the bonding of the first magnetic head chip to the base member, the second magnetic head chip is furnished in the same way as the first magnetic head chip, as indicated in FIG. 16 (second chip furnishing step 400). The second chip furnishing step 400 is initiated after the end of the first magnetic head chip, that is after the end of the position confirming step 308, so that the second magnetic head chip is furnished onto the base member after the end of bonding of the first magnetic head chip, that is after the end of the chip retention member uplifting step 311.

The second magnetic head chip is bonded to the base member in the same way as the first magnetic head chip (second chip bonding step 500). It is noted that, at the stage of completion of the second magnetic head chip bonding step, the magnetic head chip retention member retaining the second magnetic head chip is kept in the state of retaining the magnetic head chip, that is, the chip retention member uplifting step is not performed.

Figure 18:
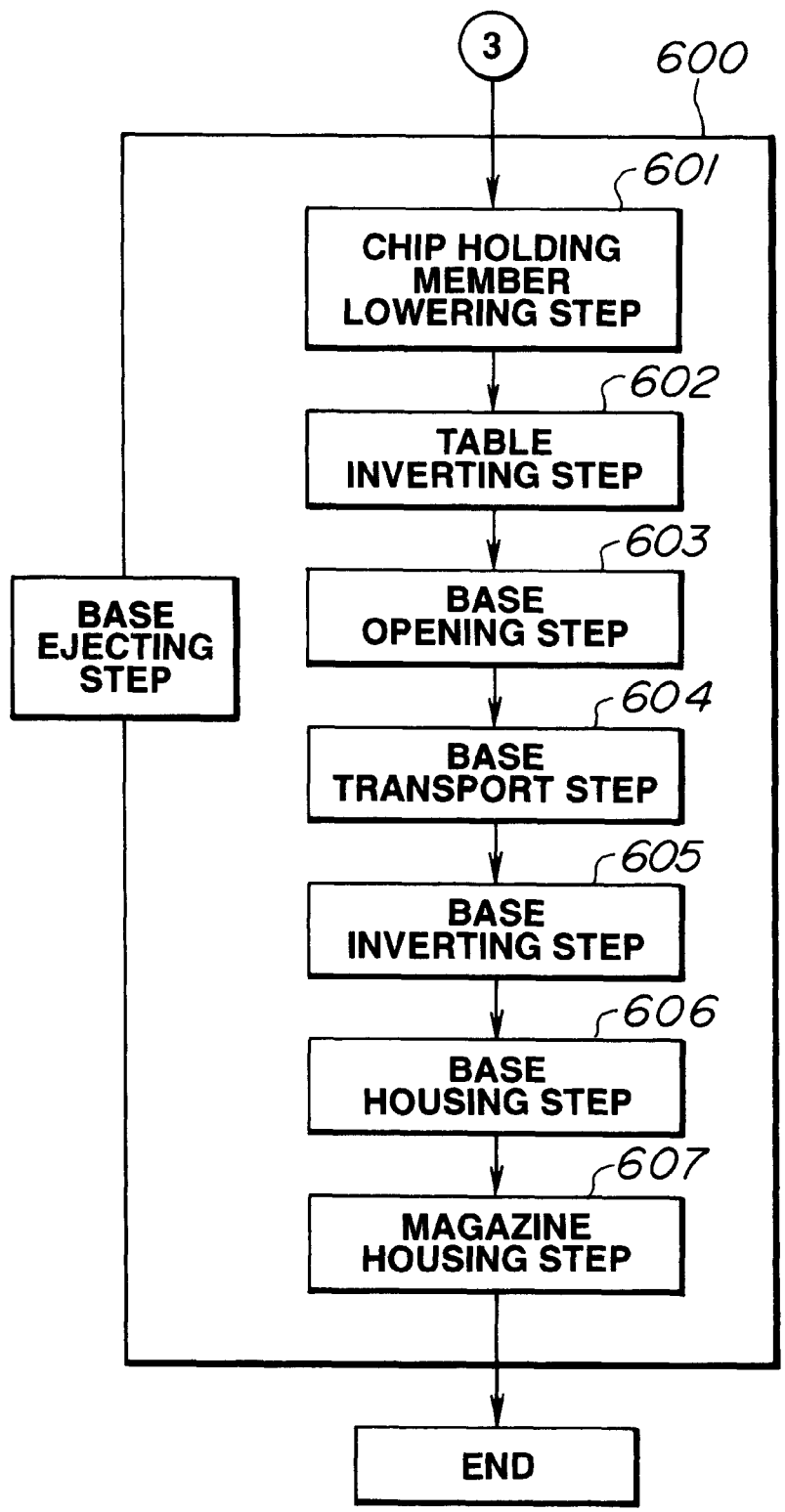
FIG. 18 illustrates the process flow, consecutive to FIG. 17, for bonding the magnetic head chip by the magnetic head chip bonding device according to the present invention.

On completion of bonding of the two magnetic head chips, the base member, to which the two magnetic head chips have now been bonded, is discharged, as indicated in FIG. 18 (base member discharging step 600). During the base member discharging step 600, the magnetic head chip retention member retaining the first magnetic head chip is lowered for retaining the first magnetic head chip (chip member retention member lowering step 601). With the magnetic head chips retained by the two magnetic head chip retention members, the table of the rotary table unit is rotated for shifting the base member towards the base member entrance/exiting unit (table rotating step 602). The retention of the magnetic head chips by the magnetic head chip retention members and the support of the base member by the base member supporting section are released (base member opening step 603). The base member is routed by the base member transporting unit towards the base member entrance/exiting unit (base member transporting step 604). After the base member is inverted in its position by the base member entrance/exiting unit to a direction suited to housing (base member inverting step 605), the base member is housed within the base member housing magazine (base member housing step 606).

The above process completes the bonding of the magnetic head chips to the base member. After completion of bonding of the magnetic head chips to the totality of the base members housed within the base member housing magazine, the magazine is transported from the base member entrance/exiting unit to a completed article stocker into which the base members and the base member housing magazine are housed (magazine housing step 607).

Meanwhile, the magnetic head chip bonding device of the present embodiment is a semi-automatic device which performs the chip positioning step by a manual operation with the aid of the handle of the magnetic head chip shifting section and which automatically performs the remaining operation. However, the present invention is not limited thereto and may comprise a full-automatic type device in which the chip positioning step is carried out automatically based upon the information from the magnetic head chip position detecting section.

In addition, the magnetic head chip supporting unit of the present embodiment may be configured to clamp the upper and lower surfaces of the magnetic head chip unit instead of clamping both lateral sides of the magnetic head chip. Although the magnetic head chip position detecting unit of the present embodiment makes use of a microscope with an objective lens fitted thereto for observing the magnetic head chip, a two-beam interference objective lens may also be employed.

What is claimed is:

1. A magnetic head chip bonding device for bonding a magnetic head chip to a base member comprising:

a magnetic head chip retention unit for variably applying pressure to the magnetic head chip and for pressing the magnetic head chip against the base member, said chip retention unit including a chip retention member which is biased into engagement with the magnetic head chip with at least two different levels of force;

a magnetic head chip holding unit for holding the magnetic head chip, said chip holding unit including a pair of chip supporting members which grip edges of the magnetic head chip therebetween;

a magnetic head chip detection unit for detecting the position of the magnetic head chip; and a magnetic head chip shifting unit for shifting the magnetic head chip holding unit in response to an output of the magnetic head chip position detection unit so as to adjust the position of the magnetic head chip on the base member to a position wherein the magnetic head chip can be bonded to the base member using an adhesive.

2. The magnetic head chip bonding device as claimed in claim 1, wherein the movement of the magnetic head chip and the magnetic head chip holding unit by the magnetic head chip shifting unit is movement along three axes perpendicular to one another and rotation about a selected one of said three axes as the center of rotation.

3. A device for bonding a chip to a base member comprising:

chip retention means for selectively applying one of a first weak force and a second strong force to the chip for pressing the chip against the base member;

supporting means for gripping and shifting the chip with respect to the base member and for positioning the chip on the base member while the weak pressure is applied to the chip;

means for determining if the chip has been disposed in a predetermined position on the base member with a predetermined degree of accuracy while the chip retention means applies the strong force to the chip and the supporting means has been separated from the chip; and means for applying an adhesive to an area between the base member and the chip while the chip is located on the base member in the predetermined position with the predetermined degree of accuracy and pressed against the base member with the strong force by the chip retention means.

4. A device for bonding a magnetic head chip to a base member as claimed in claim 3, wherein said supporting means includes means for shifting the chip along first and second mutually perpendicular axes and means for rotating the chip about a third axis perpendicular to said two axes.

* * * * *